(12) United States Patent
Alkhazraji et al.

(10) Patent No.: US 9,783,652 B2
(45) Date of Patent: Oct. 10, 2017

(54) THERMOPLASTIC BASED SULPHUR NANOCOMPOSITES

(71) Applicant: The Petroleum Institute, Abu Dhabi (AE)

(72) Inventors: Saeed Mohd Salem Alhassan Alkhazraji, Abu Dhabi (AE); Ahmed Abdelhay Ahmed Abdalla, Abu Dhabi (AE); Sara Mohammed Rashed Saeed Aldhaheri, Abu Dhabi (AE); Dana Saleh Mohamed Alhaj Fadlalla, Abu Dhabi (AE); Sara Jalal Mohamed Qeshta, Abu Dhabi (AE); Nafisa Yousif Elsamani Mohamed Ali, Abu Dhabi (AE)

(73) Assignee: THE PETROLEUM INSTITUTE, Abu Dhabi (AE)

( * ) Notice: Subject to any disclaimer, the term of this patent is extended or adjusted under 35 U.S.C. 154(b) by 65 days.

(21) Appl. No.: 14/703,358

(22) Filed: May 4, 2015

(65) Prior Publication Data
US 2015/0232635 A1 Aug. 20, 2015

Related U.S. Application Data

(63) Continuation of application No. 13/974,878, filed on Aug. 23, 2013.

(60) Provisional application No. 61/729,551, filed on Nov. 24, 2012.

(51) Int. Cl.
| | | |
|---|---|---|
| *C08K 3/30* | (2006.01) | |
| *C08K 3/06* | (2006.01) | |
| *C08J 9/00* | (2006.01) | |
| *C08L 23/06* | (2006.01) | |
| *C08L 23/12* | (2006.01) | |
| *C08L 77/00* | (2006.01) | |
| *C08L 69/00* | (2006.01) | |
| *C08L 25/06* | (2006.01) | |
| *C08L 33/12* | (2006.01) | |
| *C08L 33/08* | (2006.01) | |

(52) U.S. Cl.
CPC .............. *C08K 3/30* (2013.01); *C08J 9/0014* (2013.01); *C08J 9/0066* (2013.01); *C08K 3/06* (2013.01); *C08L 23/06* (2013.01); *C08L 23/12* (2013.01); *C08L 25/06* (2013.01); *C08L 33/08* (2013.01); *C08L 33/12* (2013.01); *C08L 69/00* (2013.01); *C08L 77/00* (2013.01)

(58) Field of Classification Search
CPC .......... C08K 3/06; C08J 2201/044; C08J 9/26
See application file for complete search history.

(56) References Cited

U.S. PATENT DOCUMENTS

| | | | | | |
|---|---|---|---|---|---|
| 2,960,453 | A | * | 11/1960 | Cook | B01J 19/122 521/50.5 |
| 4,239,630 | A | * | 12/1980 | Atkinson | C09K 8/532 134/22.14 |
| RE32,356 | E | * | 2/1987 | Cardarelli | A01K 63/04 514/128 |
| 6,664,303 | B1 | * | 12/2003 | Michael | C08L 19/003 521/41 |
| 2010/0314162 | A1 | * | 12/2010 | Gardner | B29C 67/202 174/258 |
| 2011/0152427 | A1 | * | 6/2011 | Yadav | B82Y 5/00 524/408 |

OTHER PUBLICATIONS

Machine translation of RU 2238290. 2004.*
Han, S.C.; Song, M.S..; Lee, H.; Kim, H.S.; Ahn, H.J.; Lee, J.Y. "Effect of Multiwalled Carbon Nanotubes on Electrical Properties of Lithium/Sulfur Rechargable Batteries". Journal of the Electrochemical Society, 150, A889-A893 (2003).*
Park, J.S.; Cho, G.B.; Ryu, H.S.; Ahn, J.H.; Ahn, H.J.; Kim, K.W. "Sulphur-carbon composites for Li/S batteries" Materials Technology vol. 28 p. 270-275.*

* cited by examiner

*Primary Examiner* — Mike M Dollinger
*Assistant Examiner* — Christina Wales
(74) *Attorney, Agent, or Firm* — Hayes Soloway PC

(57) ABSTRACT

A thermoplastic sulfur-polymer composite comprises a thermoplastic polymer, such as polyethylene and polystyrene; and a sulfur element. Such sulfur element functions as passive sulfur filler in this composite. The thermoplastic polymer is a polymer matrix; and the sulfur filler is dispersed in the polymer matrix. There is no chemical reaction occurs after the addition of the sulfur filler into the host polymer and no chemical bond formed between the polymer and the sulfur filler. The thermoplastic sulfur-polymer composite can be a nanocomposite by either adding certain nanofillers into the composite or making the sulfur filler as sulfur nanoparticles. With its similar physical properties and lower manufacturing costs, the thermoplastic sulfur-polymer composites are good alternatives of the respective pure polymers.

18 Claims, No Drawings

THERMOPLASTIC BASED SULPHUR NANOCOMPOSITES

CROSS-REFERENCE TO RELATED APPLICATIONS

This is a continuation of U.S. patent application Ser. No. 13/974,878, filed Aug. 23, 2013, which claims the benefit of U.S. Provisional Application No. 61/729,551, filed Nov. 24, 2012, both of which are incorporated herein by reference in their entireties.

FIELD OF THE INVENTION

The present invention relates to the polymer based thermoplastic composite. In particular, it relates to the thermoplastic composite of polymer and sulfur, which has a higher stiffness as measured by the modulus of elasticity and relatively low manufacturing costs.

BACKGROUND OF THE INVENTION

Thermoplastic, also known as thermosoftening plastic, is a polymer that becomes pliable or moldable above a specific temperature, and returns to a solid state upon cooling. Most thermoplastics are polymers, and hence have high molecular weights. In the present invention, the thermoplastic polymers can have linear, branched, ladder, dendritic or other structures. The chains of such polymer thermoplastics associate through intermolecular forces. This property allows thermoplastics to be remolded because the intermolecular interactions spontaneously reform upon cooling. The thermoplastic polymers differ from thermosetting polymers (thermoset), which form irreversible chemical bonds between the polymer chains. And in case when such bonds break down, they will not reform again upon cooling.

Regarding thermoplastic polymers, within a temperature range above their respective glass transition temperatures and below their melting points, the physical properties of the thermoplastic polymers change drastically without associated phase changes. Within this temperature range, most thermoplastics are rubbery materials due to alternating rigid crystalline and elastic amorphous regions. Some thermoplastics do not fully crystallize above glass transition temperature, retaining some, or all of their amorphous characteristics.

Based on the type of the polymers that made the thermoplastic materials, various thermoplastic materials may have different properties and hence various applications. In addition, will the addition of various fillers, the properties of thermoplastic polymers can be significantly reinforced or altered. Various fillers can be added into the polymer matrix to form new polymer products. For example, some filler may be much cheaper than the polymer. Thus by using such filler, the manufacturing costs could be lowered. In addition, the addition of some filler may enhance certain valuable properties of the host polymer. Moreover, the addition of certain filler may even bring new properties to the host polymer.

Furthermore, sulfur, as an important additive, has been widely used in various polymer products, such as rubber, which is a thermosetting polymer. The process of vulcanization is the critical step for modern rubber production. Vulcanization is a chemical process for converting rubber or related polymers into more durable materials via the addition of sulfur. The vulcanized materials are less sticky and have superior mechanical properties. Hence the vulcanized rubber can be used for making tires, hoses, belts, etc. However, such rubber vulcanization is a very different process than the process of the present invention to make the disclosed composites. First, rubber is a thermosetting polymer that has very different response when heated. After being cured (hardened), the thermosetting polymer will not melt or perform deformation again. While the thermoplastic polymers disclosed in the present invention, when heated, will become soft and thus can be reprocessed many times by recycling. Second, in vulcanization, the added sulfur will perform chemical reaction to promote the formation of cross-links between the polymer chains. The cross-links introduced by vulcanization with sulfur prevent the polymer chains from moving independently. However, in the present invention, the added sulfur, as the filler, only physically fills the spaces within the polymer matrix. There is no chemical reaction occurs; and no cross-link has been formed following the addition of sulfur.

Moreover, sulfur has been reported to be added into the thermoplastic polymers, too. However, in that case, there is actually chemical reaction occurring. New chemical bond is formed, and certain properties of the thermoplastic polymers have been altered. Thus the final product is a new type of sulfur-rich poly-conjugated polymer. The newly gained properties may make the product suitable as electroactive or conducting materials.

Furthermore, the thermoplastic polymers can also be made into nanothermoplastic polymers. Nanocomposites are a group of multiphase solid material (matrix and filler), where one of the phases (usually the filler) has at least one dimension of nanoscale (less than 300 nanometers (nm)). In this way, the mechanical, electrical, thermal, optical, electrochemical and catalytic properties of the nanocomposite will differ markedly from those of the component materials. One easy way to make the polymer nanocomposite is appropriately adding nanoparticles to a polymer matrix. And this can enhance its performance, often dramatically, by simply capitalizing on the nature and properties of the nanoscale filler. The normal nanofillers used in this context are ceramics, clays, and certain carbon nanostructures, such as nanoplatelets or nanotubes.

DETAILED DESCRIPTION OF THE INVENTION

All illustrations of the embodiments are for the purpose of describing selected versions of the present invention and are not intended to limit the scope of the present invention.

The present invention focuses on a product which incorporates element sulfur as a component (filler) in the formulation of various thermoplastic polymers. A few examples of the thermoplastic polymers applied in the present invention are polyethylene, polystyrene and etc. The composite products made in the present invention differ from other prior products.

The polymer components used in the present invention and the polymer composite generated in the present invention are both thermoplastic polymer materials. Their properties are largely the same or relatively reinforced via the process disclosed in the present invention. The additive component, the filler, used in the present invention is the element sulfur, not sulfur compound. Furthermore, elemental sulfur could be in any allotropic forms or combination of these forms. Additionally, the allotrope could be in cyclic, linear chain-like form or combination of these forms.

Additionally, there is no chemical reaction occurs, no new chemical bonds between sulfur and the thermoplastic formed following the addition of sulfur. Sulfur can react with itself, but not with the thermoplastic. In the process disclosed in the present invention, there is only physical process occurring. Moreover, no cross-link is formed between the chains of the polymers after the sulfur addition. Therefore, concerning the properties of the final product, they are very similar to those of the polymer component used to make the final product, except certain physical property, such as the stiffness, of the final product has been strengthened. For instance, when sulfur and the polymer of polyethylene are blended, they are only physically blended. If there is any chemical reaction occurring between the two components, it could be confirmed by the results from the spectroscopy studies. We have done Raman spectroscopy on various sulfur-polyethylene composites. We found that all the peaks were from either sulfur or polyethylene. No new peaks have been observed, suggesting that there is no chemical reaction between sulfur and polyethylene. Normally, if there is a chemical reaction, then Raman spectra would be able to demonstrate certain new peaks due to the formation of new chemical bonds. The role of sulfur in these disclosed sulfur-polymer composite is to provide mechanical enforcement to the host polymer. As passive filler, the sulfur is imbedded inside the polymer; and it doesn't affect the polymer structure. It is possible that the sulfur filler may carry out other functions, such as to be a barrier of gas diffusion through the polymer composite.

Therefore, the major advantages of the present invention reside in the following two aspects. First, the filling component (sulfur) is cheaper than most of the respective host polymer materials used in the present invention. So, the using of sulfur in the polymer composite production can lower the manufacturing costs. In this way, with sulfur as the filler, what's been generated as the final product is a polymer product with a relatively enhanced (stiffness) property and relatively low manufacturing costs. Additionally, under the pretty mild and conventional reactive conditions, all of the current available polymer production equipments can still to be used to make the new sulfur polymer composite products; there is no need of any new equipment or of retrofitting the equipments. For example, in the process of making the sulfur-polyethylene composite, the relatively inexpensive filler (sulfur) is used to achieve the same properties of the host polymer (polyethylene). As the production equipments and conditions are roughly no significant difference, it is reasonable to assume that the manufacturing process costs are largely the same. Therefore, the product of sulfur-polyethylene composite is less expensive compared to pure polyethylene, because the sulfur component is cheaper than polyethylene. Further, this composite product can be used to replace the pure polyethylene. The new composite generally achieves the same properties, but it costs about 10-15% less than the original polyethylene. Thus, it will be a suitable alternative to the pure polyethylene.

Second, the element sulfur added into the polymer can be specific nano-size sulfur particles. The sizes of the sulfur nanoparticles are within the nanoscale of from 1 to 100~300 nm. In addition, other nanofillers such as certain carbon nanostructures comprising various low-dimension allotropes of carbon including carbon nanotubes, the C60 family of buckyballs, polyaromatic molecules, carbon nanoplatelets, graphene and etc, can be added into the sulfur-polymer composite to enhance the composites' nanoproperties. Also, such nanostructures can be added into a polymeric sulfur (a form of the sulfur element) to further stabilize the polymeric sulfur. In the latter case, it can be achieved by processing the sulfur with the nanostructures at a temperature above the polymerization temperature of sulfur. And later on, the process of making sulfur polymer composite has to be performed at 160° C. or even higher. In the polymer nanocomposite field, clay is usually used as the nanoparticle for making such nanocomposites. Considering the processing method, chemical treatment has to be done to the clay before it can be used to make the nanocomposites; while for the sulfur disclosed in the present invention, there is no need for such chemical modification.

Nanopolymers have many dramatic and very valuable properties. Most of these important nanoproperties are due to the vast increase of the ratio of surface area to volume. The exponentially increased surface area makes it possible for new quantum mechanical effects. One example is the "quantum size effect" where the electronic properties of solids are altered with great reductions in particle size. In addition, a certain number of physical properties may also be altered in the nanomaterials. The added nanoparticles, such as the sulfur nanoparticles of the present invention, can strongly influence the mechanical properties of the polymers, such as stiffness and elasticity. The nanotechnologically enhanced materials may enable a weight reduction accompanied by an increase in stability and improved functionality. In this way, according to the present invention, the application of sulfur nanoparticles in the polymer matrix to form the nanosulfur-polymer composite is able to provide the new polymer nanomaterial with certain valuable properties; and therefore they can find important applications in many different industrious areas.

Moreover, the combining of element sulfur and thermoplastic polymers is a unique feature itself. It has not been reported previously. It is true that the polymer sulfurization has been reported before. However, in those processes, the sulfur functions in a chemical reaction and is involved in the formations of bonds or cross-links between the polymer chains. Therefore, there were chemical reactions occurring and new materials forming in those examples. Also, the reaction conditions of those sulfurization processes and of the process disclosed in the present invention are very different. The reaction condition of the present invention is pretty mild and conventional; hence there is no need of new special equipments. Therefore, the process of the present invention can be scaled up without the need of custom-designed equipments.

Due to the fact that in the sulfur-polymer composite, there is no chemical bond formed between the host polymer and the filler sulfur, these two components actually can be separated so as to remove one component from the composite and thus produce a new product. For example, the sulfur can be "leached out" by adding a solvent that can selectively dissolve the sulfur but not the polymer (such as polyethylene). On the other hand, it is also possible to selectively remove the polymer and keep the sulfur. In the first case, a porous polymer will be produced. In the second one, a porous sulfur structure will be produced. In this way, more various products can be produced from the same formulation. These porous materials can be used in many applications.

The products of the disclosed sulfur polymer thermoplastic composites mentioned herein can be used in several applications. For example, when the polymer component used in the present invention is polyethylene, the disclosed sulfur-polymer composite can be used to make pipes, bottles, packages, cables, coatings and polymer beads. While the polymer component is a different type, such as the aromatic polyamide polymer, the properties and application areas would be different.

The composites disclosed in the present invention can be made through different approaches. In each approach, mixing of the two components, the thermoplastic polymer and the sulfur element, is the key step for making the disclosed thermoplastic composites. The mixing can be made in a number of different ways, such as mixing by applying heat, applying pressure, applying heat and pressure; mixing in a common solvent, in supercritical fluids; by extrusion, molding, melting, pressing; by in situ polymerization; by sonication processes; or by ionic liquid processing.

One major polymer component used in the present invention is the polyethylene, especially the low density polyethylene as commonly known in the plastic industry. Moreover, it can be selected from a wide variety of different polymers, such as acrylonitrile butadiene styrene (ABS), acrylic (PMMA), celluloid, cellulose acetate, cycloolefin copolymer (COC), ethylene-Vinyl Acetate (EVA), ethylene vinyl alcohol (EVOH), fluoroplastics (PTFE, alongside with FEP, PFA, CTFE, ECTFE, ETFE), ionomers, kydex, liquid crystal polymer (LCP), polyacetal (POM or Acetal), polyacrylonitrile (PAN or Acrylonitrile), polyamide (PA or Nylon), polyamide-imide (PAI), polyaryletherketone (PAEK or ketone), polybutadiene (PBD), polybutylene (PB), polybutylene terephthalate (PBT), polycaprolactone (PCL), polychlorotrifluoroethylene (PCTFE), polyethylene terephthalate (PET), polycyclohexylene dimethylene terephthalate (PCT), polycarbonate (PC), polyhydroxyalkanoates (PHAs), polyketone (PK), polyester, polyethylene (PE), polyetheretherketone (PEEK), polyetherketoneketone (PEKK), polyetherimide (PEI), polyethersulfone (PES), polyethylenechlorinates (PEC), polyimide (PI), polylactic acid (PLA), polymethylpentene (PMP), polyphenylene oxide (PPO), polyphenylene sulfide (PPS), polyphthalamide (PPA), polypropylene (PP), polystyrene (PS), polysulfone (PSU), polytrimethylene terephthalate (PTT), polyurethane (PU), polyvinyl acetate (PVA), polyvinyl chloride (PVC), polyvinylidene chloride (PVDC), styrene-acrylonitrile (SAN), polydimethylsiloxane (PDMS), polysilanes, polythiazyls, polystannane and polyphosphazene.

The present invention will next be described with reference to the related exemplary embodiments.

Polymer A was dissolved in a solvent X, and sulfur was also dissolved in solvent X. Then the two solutions were mixed and the solvent was removed through film casting and drying process. A composite (or nanocomposite) is therefore formed, wherein the sulfur is dispersed in the host polymer. Such formed thermoplastic sulfur polymer A composite can be used as is, or can be reshaped or reprocessed.

Polymer B was heated above its melting temperature. Sulfur was next added to this melt polymer B. And the product would next be extruded. The composite (either conventional blend composite or nanocomposite) would be used as is, or can be reprocessed to make for specific shape for certain applications.

In the present invention, the polymer A can be polystyrene, poly(methyl methacylate), polyamide, and so on. The polymer B can be polyethylene, polypropylene, poly(methyl ethacrylate), polycarbonate and etc. The solvent X can be Toluene, carbon disulfide, dimethyl sulfoxide, and the like.

The following are two examples of the procedures whereby the disclosed sulfur-polymer composites are made.

The composite can be made through a melting process:

1) Polyethylene (polymer B) is fed to an extruder operating above the melting temperature of the polymer. In one experiment, this temperature is 140° C. The extruder consists of twin-screws co-rotating at 100 RPM. The extrusion process is done under the inert condition by flowing nitrogen gas through the extruder barrel.

2) Sulfur is fed to the extruder after the step 1). The polyethylene and sulfur are co-extruded at a specific temperature for a specified period of time (in this experiment, it is 1 minute).

3) After the process of extrusion is finished, the molten blend is rejected from the extruder and collected into a container.

4) The mass fraction of sulfur is controlled by varying the amount added to the extruder or by reprocessing a master batch of known sulfur/polyethylene mass fractions.

In this example, the equipment used in the processing is a commercial extruder, which is the common equipment in polymer processing. Other processing equipments that can be used as well include batch mixer, injection molding machine, and so on.

The composite can also be made through a solution blending process:

1) Sulfur is dissolved in Toluene (an organic solvent).

2) Polystyrene is dissolved in Toluene in a different container.

3) Sulfur Toluene solution is mixed with polystyrene Toluene solution in a fixed proportion to produce a sulfur-polystyrene solution in Toluene 4) The solution is cast onto a glass container and the Toluene solvent is dried.

5) When all solvent is dried and removed, a continuous film containing sulfur-polystyrene and sulfur is produced.

On the other hand, the component sulfur element used in the present invention could be specifically prepared. For example, the sulfur by itself can be polymerized to generate the "polymeric sulfur". However, one major drawback of this method is that such "sulfur polymer" is prone to undergo the process of de-polymerization. It is possible that by extruding sulfur with thermoplastic that sulfur will undergo polymerization and will produce "polymeric sulfur" inside the composite (nanocomposites). Furthermore, polymeric sulfur can be made stable inside the composite by virtue of this physical mixing.

The mechanical properties of these composites were relatively improved. And they could be further improved with process optimizations. The Table 1 below shows the mechanical properties (such as stiffness) of the polymer composites made with 0, 2.5, 5, 10 and 20 percentages (mass fraction percentage) of sulfur loading. Concerning Young's modulus, which is the most commonly used index to measure material's stiffness, in comparison of the value of Young's modulus of the pure polymer (0% of sulfur) and that of the composite with 20% sulfur, Young's modulus (stiffness) has been increased by roughly at least 5-10% (from about 142 MPa to about 159 MPa). This at least ~5-10% increase in modulus is decent and can be further improved. In addition, other mechanical properties do not decrease with the addition of element sulfur. Regarding the other two physical properties, elongation at break (%) and ultimate strength (MPa), it appears that there is no significant difference between the polymers with or without the sulfur addition. Further, the optical properties of the new composite are different than those of the native polyethylene. For example, the native polyethylene (with no sulfur) is translucent but when sulfur is added, the composites become opaque. This opaqueness depends on the sulfur loading.

Table 1, Summary of the mechanical characterization for the produced sulfur polymer composites

| Sulfur content | Young's Modulus (Mpa) | Elongation at break (%) | Ultimate strength (Mpa) |
| --- | --- | --- | --- |
| 0 | 142 ± 8 | 64 ± 4 | 13 ± 0.4 |
| 2.5 | 152 ± 6 | 50 ± 15 | 13 ± 0.3 |
| 5 | 162 ± 3 | 61 ± 4 | 12 ± 1 |
| 10 | 159 ± 6 | 60 ± 4 | 13 ± 0.3 |
| 20 | 159 ± 9 | 65 ± 10 | 12 ± 0.5 |

In general, one major unique aspect of the present invention is that the production of the disclosed composites can be produced or manufactured with the existing thermoplastic processing and manufacturing technologies. There is no need to replace or modify any of the currently used devices or equipments in order to make these disclosed composite products. On the other hand, the sulfur element is incorporated into the host (matrix) polymer without the implication of any chemical reactions and of the formation of polymer chain cross-links. There is only physical process involved in the composite formation of the present invention. Furthermore, the physical properties of the produced sulfur polymer composite are either the same, or relatively enhanced.

Although the invention has been explained in relation to its preferred embodiment, it is to be understood that many other possible modifications and variations can be made without departing from the spirit and scope of the invention as herein described.

What is claimed is:

1. A method for preparing a composite product, the method comprising:
    melting and/or dissolving a thermoplastic polymer, wherein the thermoplastic polymer comprises polyethylene or polypropylene;
    adding elemental sulfur to the melted and/or dissolved thermoplastic polymer to form a sulfur-polymer composite under conditions effective that the elemental sulfur does not chemically react with the thermoplastic polymer; and
    adding a solvent to the sulfur-polymer composite effective to dissolve the elemental sulfur from the formed sulfur-polymer composite to provide a porous polymer composite product.

2. The method of claim 1, wherein the thermoplastic polymer comprises polyethylene.

3. The method of claim 1, wherein the polyethylene comprises low density polyethylene.

4. The method of claim 1, wherein the thermoplastic polymer comprises polypropylene.

5. The method of claim 1, wherein the elemental sulfur is added in an amount effective to increase a Young's modulus value of the sulfur-polymer composite relative to a Young's modulus value of a polymer composite prepared from the thermoplastic polymer with no added elemental sulfur.

6. The method of claim 1, further comprising adding a nanoscale allotropic carbon filler, wherein said nanoscale allotropic carbon filler comprises at least one of carbon nanotubes, C60 buckyballs, carbon nanoplatelets, and graphene; and the composite product formed thereby is a nanocomposite.

7. The method of claim 1, wherein the elemental sulfur is in the form of nanoparticles.

8. The method of claim 1, wherein the elemental sulfur is in the form of polymeric sulfur, and the step of adding elemental sulfur to the melted and/or dissolved thermoplastic polymer comprises extruding the polymeric sulfur with the thermoplastic polymer.

9. The method of claim 8, further comprising adding a nanofiller to the elemental polymeric sulfur at a temperature higher than a polymerization temperature of the sulfur, the nanofiller comprising nanoscale allotropes of carbon selected from the group consisting of carbon nanotubes, C60 buckyballs, carbon nanoplatelets, and graphene.

10. The method of claim 2, wherein the elemental sulfur is added in an amount effective to increase a Young's modulus value of the sulfur-polymer composite relative to a Young's modulus value of a polymer composite prepared from polyethylene with no added elemental sulfur.

11. The method of claim 1, wherein the elemental sulfur is included in a mass fraction percentage of no more than 20 percent.

12. The method of claim 1, wherein the polymer comprises polyethylene, the elemental sulfur is included in a mass fraction percentage of no more than 20 percent, and the composite product has a Young's modulus value at least 5 percent higher than a Young's modulus value of a polymer composite prepared from polyethylene with no added sulfur.

13. The method of claim 1, wherein the elemental sulfur added to the thermoplastic polymer is in cyclic form, linear chain form, or combination thereof.

14. The method of claim 1, wherein the thermoplastic polymer comprises polypropylene, and the elemental sulfur is included in an amount effective to decrease gas diffusion through the composite product.

15. The method of claim 1, wherein the elemental sulfur added to the polymer is in the form of polymeric sulfur, and the method further comprises adding a nanofiller to the polymeric sulfur at a temperature higher than a polymerization temperature of the sulfur, wherein the nanofiller comprises nanoscale allotropes of carbon selected from at least one of carbon nanotubes, C60 buckyballs, carbon nanoplatelets, and graphene, and wherein the step of adding the elemental sulfur to the melted and/or dissolved thermoplastic polymer comprises extruding the polymeric sulfur with the thermoplastic polymer.

16. The method of claim 1, further comprising dissolving the elemental sulfur in a solvent to provide a first mixture, and wherein the step of melting and/or dissolving a thermoplastic polymer comprises dissolving the thermoplastic polymer in the solvent to provide a second mixture and the step of adding elemental sulfur to the melted and/or dissolved thermoplastic polymer comprises adding the first mixture to the second mixture to form a third mixture.

17. The method of claim 16, further comprising removing the solvent from the third mixture.

18. The method of claim 1, wherein the step of melting and/or dissolving a thermoplastic polymer comprises heating the thermoplastic polymer above its melting temperature, and the method further comprises extruding the sulfur-polymer composite.

* * * * *